United States Patent
Takenaka

(10) Patent No.: US 6,456,342 B1
(45) Date of Patent: Sep. 24, 2002

(54) LCD DEVICE HAVING A NOISE-SHIELD LAYER DIRECTLY BETWEEN LCD AND EL PANEL

(75) Inventor: Hidetoshi Takenaka, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,075

(22) Filed: Feb. 26, 1999

(30) Foreign Application Priority Data

Feb. 27, 1998 (JP) .......................................... 10-047714

(51) Int. Cl.⁷ ............................................. G02F 1/1333
(52) U.S. Cl. ............................... 349/58; 349/110; 349/65
(58) Field of Search .......................... 349/40, 58, 110, 349/65, 50; 361/31, 32

(56) References Cited

U.S. PATENT DOCUMENTS

| | | | | |
|---|---|---|---|---|
| 5,140,450 A | * | 8/1992 | Nikaido | 428/1 |
| 5,990,989 A | * | 11/1999 | Ozawa | 349/61 |
| 6,020,945 A | * | 1/2000 | Sawai et al. | 349/119 |
| 6,055,029 A | * | 4/2000 | Kurihara et al. | 349/58 |
| 6,147,732 A | * | 11/2000 | Aoyama et al. | 349/112 |

FOREIGN PATENT DOCUMENTS

| | | |
|---|---|---|
| GB | 2290405 | 12/1995 |
| GB | 2327288 | 1/1999 |
| JP | 63-173395 | 7/1988 |
| JP | 64-15789 | 1/1989 |
| JP | 3-45985 | 2/1991 |
| JP | 5-93909 | 4/1993 |
| JP | 7-45103 | 2/1995 |
| JP | 9-152605 | 6/1997 |
| JP | 10-215085 | 8/1998 |
| JP | 10-244054 | 9/1998 |

\* cited by examiner

*Primary Examiner*—Toan Ton
(74) *Attorney, Agent, or Firm*—Sughrue Mion, PLLC

(57) ABSTRACT

A liquid crystal display device includes a shield layer for acoustic noise prevention between an LCD and an EL panel serving as a backlight source for the LCD. The shield layer is fixed to the surface of the EL panel by adhesion.

20 Claims, 5 Drawing Sheets

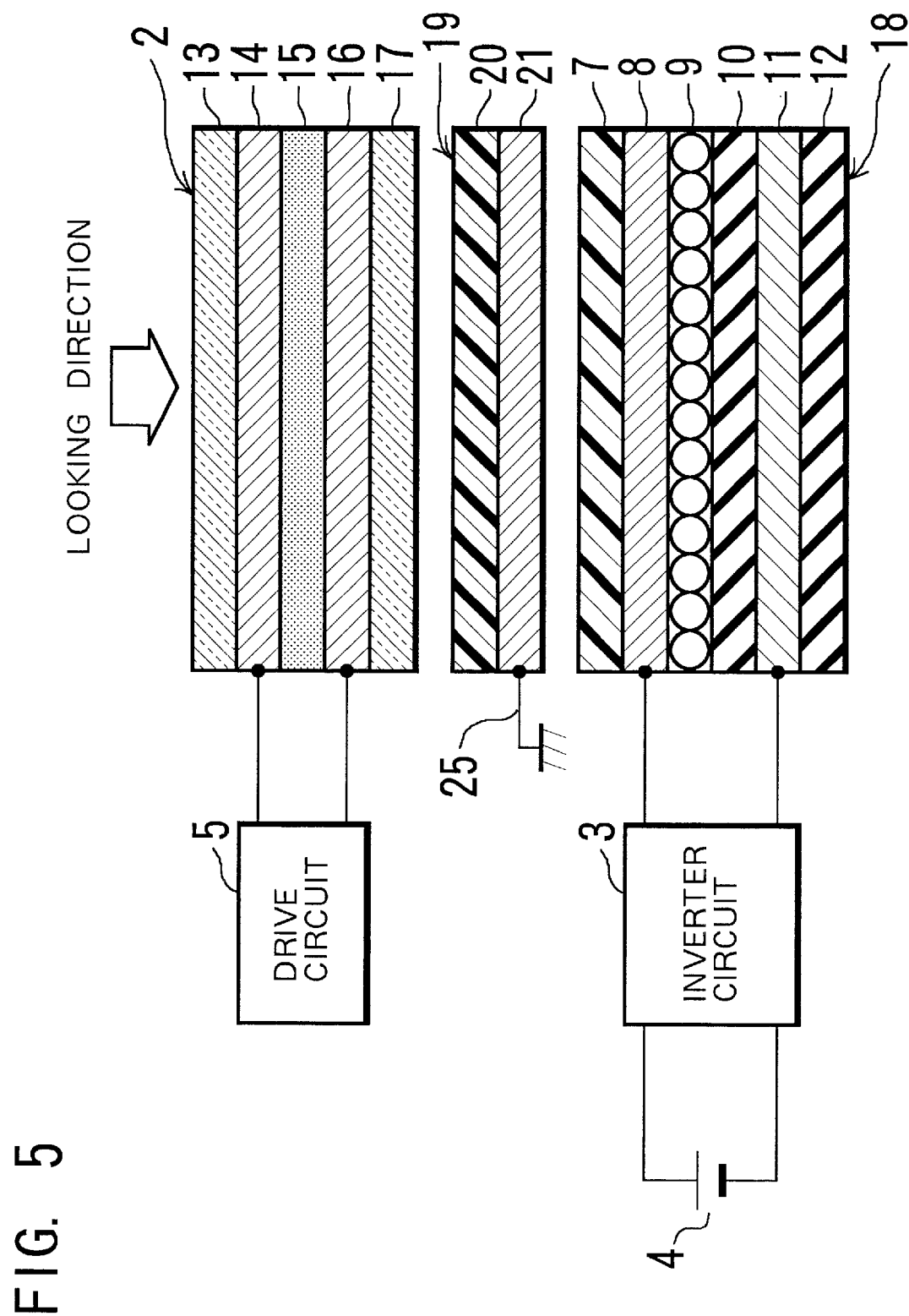

LCD DEVICE HAVING A NOISE-SHIELD LAYER DIRECTLY BETWEEN LCD AND EL PANEL

BACKGROUND OF THE INVENTION

1. Field of the Invention

The present invention relates to a display device and, more particularly, to an improvement in a liquid crystal display device having an electroluminescence (to be referred to as an EL hereinafter) panel as a backlight source.

2. Description of the Prior Art

An EL panel is conventionally utilized as a backlight source for a liquid crystal display device. When an EL panel is used as a backlight source, the circuit portions of the display device mounted on the circuit board must be protected from electromagnetic wave noise generated by the EL panel.

In a liquid crystal display device disclosed in Japanese Unexamined Patent Publication No. 9-152605, as shown in FIG. 1, an EL panel 52 is placed on a circuit board 51 by stacking, a liquid crystal panel 54 is placed on an emission surface 52a side of the EL panel 52 by stacking, and a frame 55 is mounted on the surface of the liquid crystal panel 54. A shield layer 53 is formed on the lower surface of the EL panel 52. Since the shield layer 53 is provided between the EL panel 52 and circuit board 51, the electromagnetic wave noise generated by the EL panel 52 is prevented from adversely affecting the respective circuits on the circuit board 51.

In the liquid crystal display device of this type, the electromagnetic wave noise generated by the EL panel can be prevented from adversely affecting the respective circuits on the circuit board. If, however, the liquid crystal display device is applied to a portable terminal such as a cellular phone or PHS, since a display 33 is arranged near an ear piece 32, as shown in FIG. 2, the acoustic noise generated by the EL panel increases due to the resonance of the display 33. Even slight noise becomes offensive to the ear to discomfort the user.

SUMMARY OF THE INVENTION

The present invention has been made in consideration of the above situation of the prior art, and has its object to provide a liquid crystal display device in which noise output from a speech reception port and a display due to acoustic noise from an EL panel can be decreased.

In order to achieve the above object, according to the first main aspect of the present invention, there is provided a liquid crystal display device comprising a shield layer for acoustic noise prevention between an LCD and an EL panel serving as a backlight source for the LCD.

In addition to the first main aspect, the present invention also has auxiliary aspects as follows.

According to the first auxiliary aspect, the shield layer of the first main aspect is fixed to a surface of the EL panel by adhesion.

According to the second auxiliary aspect, the shield layer of the first main aspect is fixed to the LCD through a double-coated tape by adhesion.

According to the third auxiliary aspect, the shield layer of the first main aspect is a transparent electrode layer connected to ground.

According to the fourth auxiliary aspect, the transparent electrode layer of the third auxiliary aspect is formed on one entire surface of the EL panel.

According to the fifth auxiliary aspect, the transparent electrode layer of the third auxiliary aspect has an impedance set to less than several ten kΩ.

According to the sixth auxiliary aspect, the shield layer of the first main aspect is a conductor selected from a group consisting of an ITO foil, an aluminum foil and silver foil.

In order to achieve the above object, according to the second main aspect of the present invention, there is provided a liquid crystal display device comprising a ground plate between an LCD and an EL panel serving as a backlight source for the LCD.

The ground plate of the second main aspect is formed by forming a transparent electrode layer on one surface of a PET film.

According to the present invention having the aspects described above, an electromagnetic wave preventive ground plate having a transparent electrode layer or transparent electrode connected to ground is placed between an LCD and an EL panel to shield an electric field that varies in accordance with a drive frequency generated by the EL panel. Resonance (acoustic noise) between the EL panel and the transparent electrode of the LCD can accordingly be decreased. As a result, noise output from the ear piece and display can be decreased.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 5 is a schematic sectional view of a modification of an EL panel and an LCD.

DETAILED DESCRIPTION OF PREFERRED EMBODIMENTS

Several preferred embodiments of the present invention will be described with reference to the accompanying drawings.

Figure 1:
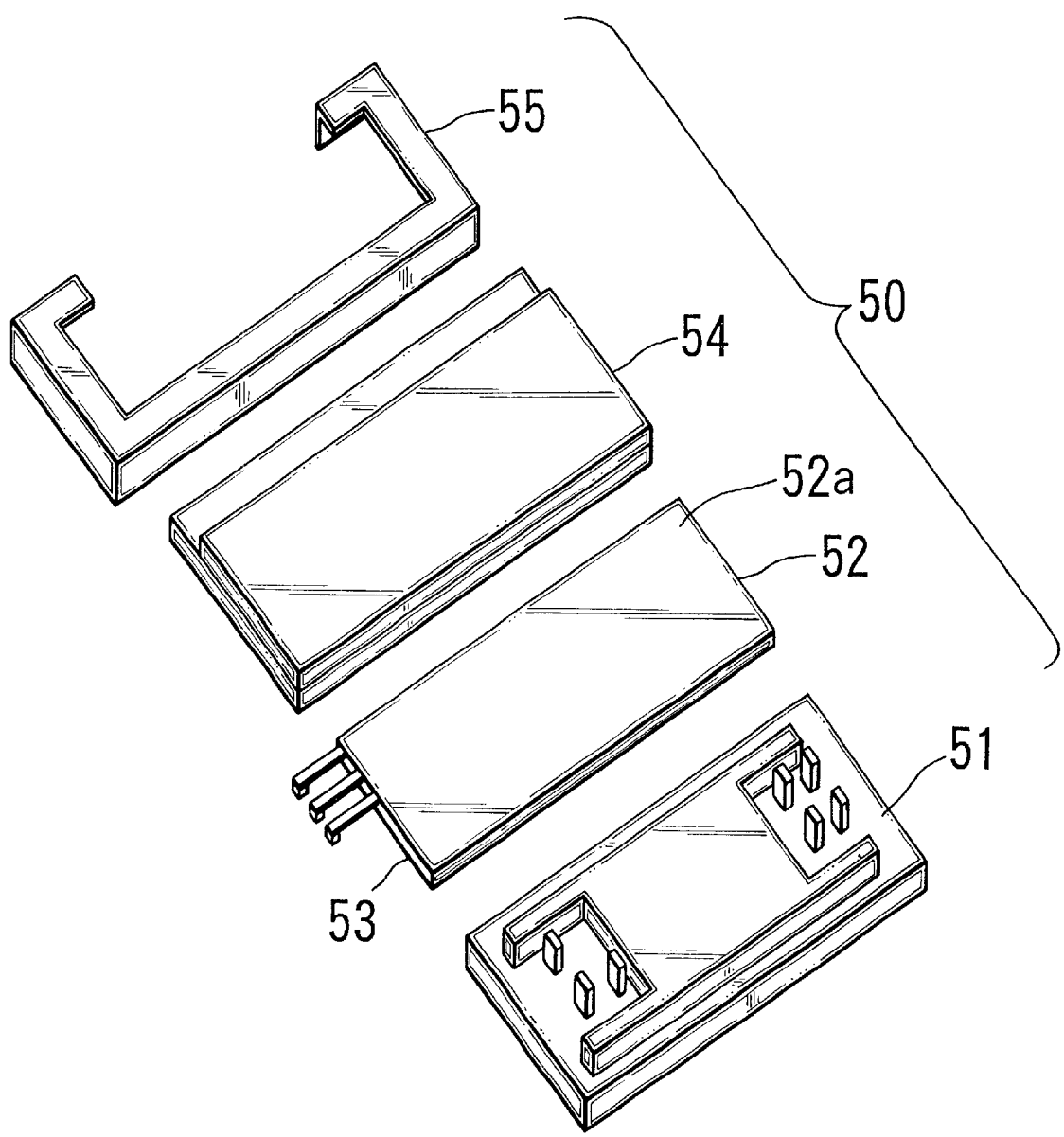
FIG. 1 is an exploded perspective view showing the main components of a conventional liquid crystal display device.
Figure 2:
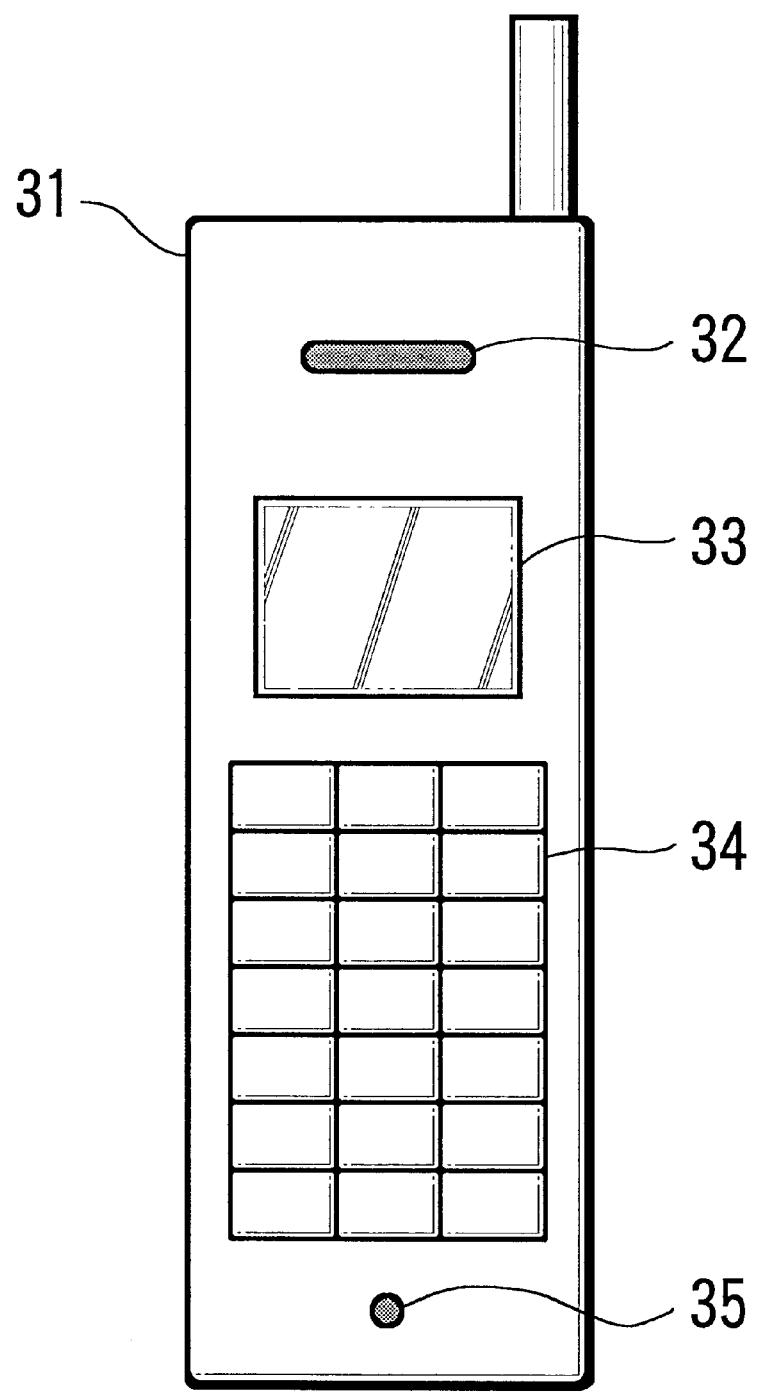
FIG. 2 is a front view showing a conventional cellular phone.
Figure 3:
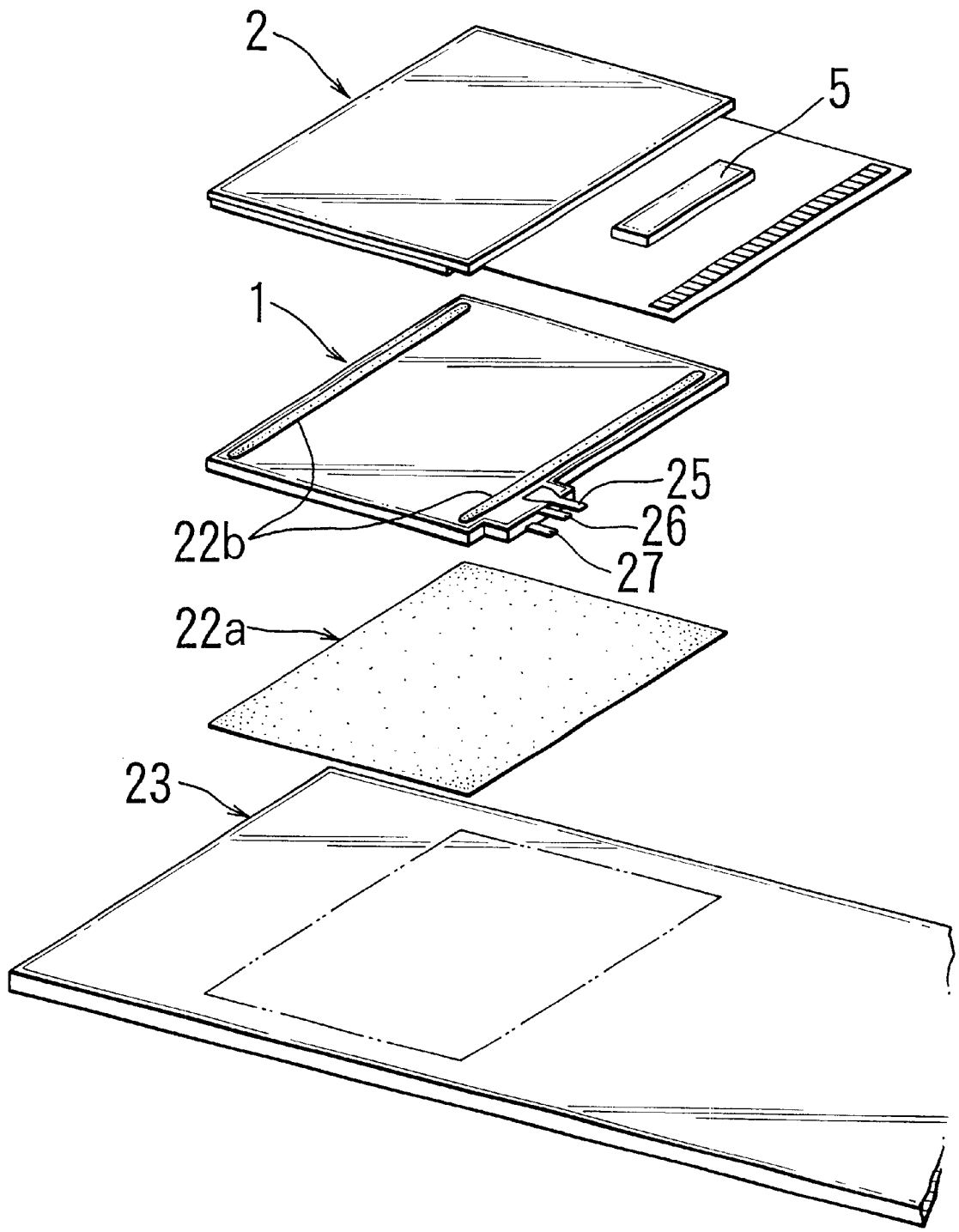
FIG. 3 is an exploded perspective view showing the main components of a liquid crystal display device according to the present invention.

FIG. 3 is an exploded perspective view of the main components of a display device according to an embodiment.

Referring to FIG. 3, the display device of this embodiment has a circuit board 23 on which mounting parts are mounted at predetermined positions. The circuit board 23 and the lower surface of an EL panel 1 are adhered to each other through a double-coated tape 22a. The double-coated tape 22a is used for fixing the EL panel 1 to the circuit board 23. When the EL panel 1 is firmly fixed to the circuit board 23 with the double-coated tape 22a, vibration of the EL panel 1 can be suppressed. The EL panel 1 is provided with a ground terminal 25, an upper surface electrode terminal 26, and a lower surface electrode terminal 27. A transparent electrode layer (not shown) formed on the upper surface of the EL panel 1, and an LCD 2 are adhered to each other through a double-coated tape 22b. The double-coated tape 22b is employed to fix the LCD 2 and is preferably a thin tape having a thickness of about 0.1 μm (micrometer).

Figure 4:
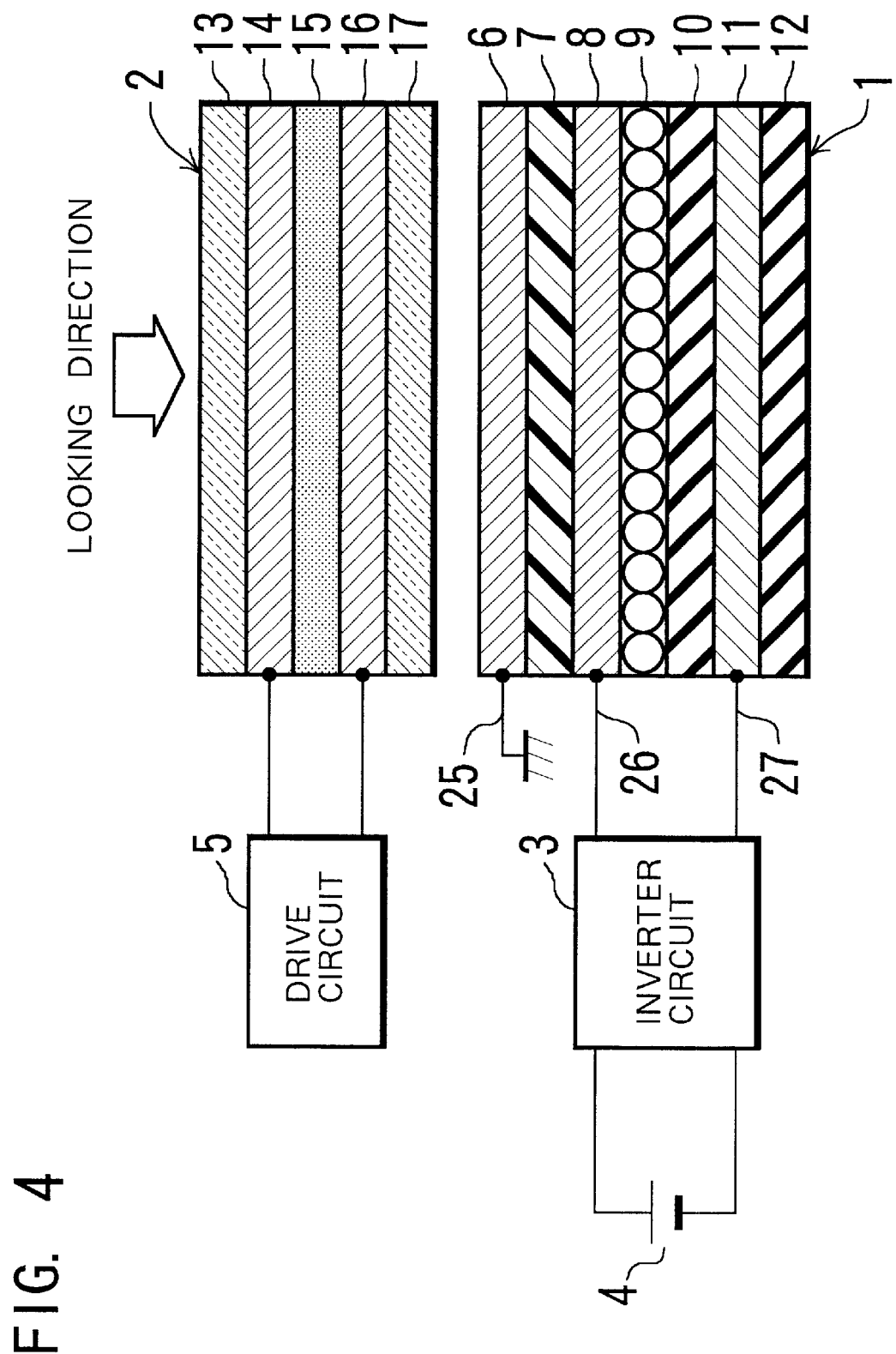
FIG. 4 is a schematic sectional view of an EL panel and an LCD shown in FIG. 3 according to an embodiment.

FIG. 4 shows the sectional arrangement of the EL panel 1 and LCD 2 shown in FIG. 3.

Referring to FIG. 4, the EL panel 1 is constituted by a PET film 7, a transparent electrode layer 8, an emission layer 9, an insulator layer 10, a rear electrode layer 11, and an insulating layer 12. The PET film 7 is formed of polyester, and the transparent electrode layer 8 is formed by forming a thin indium-tin oxide (ITO) film on the surface of the PET film 7 by vapor deposition. The emission layer 9 is formed of ZnS (zinc sulfide) or the like, and the insulator layer 10 is formed of an insulator such as a rubber-based resin. The rear electrode layer 11 is formed of carbon, and the insulating layer 12 is formed by overcoating such as resist printing.

An acoustic noise preventive shield layer, preferably a transparent electrode layer 6, connected to ground through the ground terminal 25 is formed on the surface of the EL panel 1. The transparent electrode layer 6 is desirably formed on the surface of the EL panel 1 as large as possible. Hence, it is preferable to form the transparent electrode layer 6 on the surface of a large PET film by vapor deposition and to pattern it into the shape of the EL panel 1, so that it is present on the entire surface of the EL panel 1. The impedance of the transparent electrode layer 6, i.e., the resistance, is desirably set to a low value, e.g., less than several ten kΩ. Although a conductor such as an aluminum foil or a silver foil having a low resistance can be used as the transparent electrode layer 6, it decreases the function of the LE as the backlight. Therefore, a transparent electrode layer having a high optical transmission such as, for example, an ITO foil is desirably used.

An inverter circuit 3 is controlled by a CPU (not shown). For example, when the user operates a switch (not shown), the inverter circuit 3 boosts the voltage of a DC power supply 4 and converts the voltage to an AC signal. The AC signal is applied to the EL panel 1 through the upper surface electrode terminal 26 and lower surface electrode terminal 27 to cause it to emit light. The voltage of the output signal from the inverter circuit 3 is usually as high as AC 100 V, and a drive frequency in an audio frequency band of about 200 Hz to 600 Hz is used.

The LCD 2 is constituted by a glass plate 13 having a polarizing film, a transparent electrode layer 14, a liquid crystal 15, a transparent electrode layer 16, and a glass plate 17 having a polarizing film, and is connected to a drive circuit 5.

In this arrangement, in the EL panel 1, when the output signal from the inverter circuit 3 is applied to the transparent electrode layer 8 and rear electrode layer 11, an electric field moving in the vertical direction (to the upper and lower directions) is generated by the transparent electrode layer 8 and rear electrode layer 11 to cause the emission layer 9 to emit light. Although the electric field generated by the transparent electrode layer 8 of the EL panel 1 is also generated in the direction toward the LCD 2, it is shielded as it is attracted by ground due to the low-impedance transparent electrode layer 6 formed on the surface of the EL panel 1.

The present invention has been described so far by way of its preferred embodiment. The liquid crystal display device according to the present invention is not limited to the above embodiment. For example, although the transparent electrode layer 6 connected to ground is formed on the surface of the EL panel 1 in the liquid crystal display device of the above embodiment, a ground plate 19, on which a transparent electrode layer 21 formed on one surface of a PET film 20 is formed, may be placed between an LCD 2 and an EL panel 18, as shown in the modification of FIG. 5. The transparent electrode layer 21 is connected to ground. The ground plate 19 must be fixed by, e.g., adhering it to the EL panel 18. In the liquid crystal display device of this modification, the transparent electrode layer 21 is formed on the separate PET film 20 by vapor deposition. Although this liquid crystal display device is inferior to that shown in FIG. 4 in terms of cost, optical transmission, thickness, and assembly easiness, it is excellent as a temporary countermeasure in the manufacturing process.

In the embodiment and its modification described above, the EL panel is fixed to the circuit board with the double-coated tape. Alternatively, the EL panel may be fixed by adhering it to a rigid substrate (base).

What is claimed is:

1. A liquid crystal display device comprising a shield layer for acoustic noise prevention between an LCD and an EL panel serving as a backlight source for said LCD; wherein said shield layer is in direct contact with a surface of said EL panel.

2. A device according to claim 1, wherein said shield layer is fixed to said LCD by adhesion.

3. A device according to claim 2, wherein said shield layer is fixed to said LCD with double-coated tape.

4. A device according to claim 1, wherein said shield layer is a transparent electrode layer connected to ground.

5. A device according to claim 4, wherein said transparent electrode layer is formed on one entire surface of said EL panel.

6. A device according to claim 1, wherein said transparent electrode layer has an impedance set to less than several ten kΩ .

7. A device according to claim 1, wherein said shield layer is a conductor selected from a group consisting of an ITO foil, an aluminum foil and silver foil.

8. A liquid crystal display device comprising:
   a ground plate between an LCD and an EL panel; and
   a shield layer in direct contact with a surface of said EL panel,
   wherein said EL panel serves as a backlight source for said LCD.

9. A device according to claim 8, wherein said ground plate is formed by forming a transparent electrode layer on one surface of a PET film.

10. A liquid crystal display device, comprising:
    a circuit board;
    an EL panel, wherein said EL panel is positioned on top of said circuit board and said EL panel serves as a backlight;
    a noise prevention shield layer, wherein said EL panel is positioned between said noise prevention shield layer and said circuit board; and
    a liquid crystal display, wherein said noise prevention shield layer is positioned between said liquid crystal display and said EL panel, and said EL panel serves as said backlight for said liquid cystal display;

wherein said noise prevention shield layer is in direct contact with said surface of said EL panel.

11. A device according to claim 10, wherein said noise prevention shield layer is fixed to said liquid crystal display by adhesion.

12. A device according to claim 11, wherein said noise prevention shield layer is fixed to said liquid crystal display by double-coated tape.

13. A device according to claim 12, wherein said double-coated tape is about 0.1 $\mu$m thick.

14. A device according to claim 10, wherein said noise prevention shield layer is a transparent electrode layer connected to a ground.

15. A device according to claim 14, wherein said transparent electrode layer is formed on one entire surface of said EL panel.

16. A device according to claim 14, wherein said transparent electrode layer has an impedance set to less than several tens of k$\Omega$.

17. A device according to claim 14, further comprising a PET film, wherein said PET film is positioned between said transparent electrode layer and said EL panel.

18. A device according to claim 14, wherein said transparent electrode layer is formed on a surface of said PET film by vapor deposition and patterned to conform to said EL panel.

19. A device according to claim 14, further comprising a ground plate, wherein said ground plate has a PET film formed on one surface of said ground plate and said transparent elecrode layer is formed on said PET film.

20. A device according to claim 10, wherein said shield layer is a conductor selected from a group consisting of an ITO foil, an aluminum foil and a silver foil.

* * * * *